(12) United States Patent
Forlong (10) Patent No.: US 10,035,245 B2
(45) Date of Patent: Jul. 31, 2018

(54) CLAMP FOOT AIR JET APPARATUS

(71) Applicant: Eigen Systems Limited, Albany, Auckland (NZ)

(72) Inventor: Murray Houlton Forlong, Auckland (NZ)

(73) Assignee: EIGEN SYSTEMS LIMITED, Albany, Auckland (NZ)

( * ) Notice: Subject to any disclaimer, the term of this patent is extended or adjusted under 35 U.S.C. 154(b) by 164 days.

(21) Appl. No.: 14/397,369

(22) PCT Filed: Apr. 12, 2013

(86) PCT No.: PCT/NZ2013/000063
§ 371 (c)(1),
(2) Date: Oct. 27, 2014

(87) PCT Pub. No.: WO2013/165259
PCT Pub. Date: Nov. 7, 2013

(65) Prior Publication Data
US 2015/0076758 A1 Mar. 19, 2015

(30) Foreign Application Priority Data
Apr. 30, 2012 (NZ) .................................. 599678

(51) Int. Cl.
*B25B 5/16* (2006.01)
*B25B 5/00* (2006.01)
(Continued)

(52) U.S. Cl.
CPC .............. *B25B 5/006* (2013.01); *B23Q 3/002* (2013.01); *B23Q 11/005* (2013.01)

(58) Field of Classification Search
CPC .... B25B 1/00; B25B 3/00; B25B 5/00; B25B 5/006
See application file for complete search history.

(56) References Cited

U.S. PATENT DOCUMENTS 3,190,661 A 6/1965 Wahl et al.
4,293,251 A 10/1981 Anderson
(Continued)

FOREIGN PATENT DOCUMENTS

GB 2269551 A 2/1994
JP 2001038513 A 2/2001

OTHER PUBLICATIONS

European Search Report for Patent Application No. 13785109.3-1702 / 2844430 dated Oct. 28, 2016.
(Continued)

*Primary Examiner* — David Bryant
*Assistant Examiner* — Nirvana Deonauth
(74) *Attorney, Agent, or Firm* — Greer, Burns & Crain, Ltd.

(57) ABSTRACT

A replaceable ring shaped member for a clamp foot air jet apparatus for a clamp foot for clamping a plate for a cutting tool, includes a clamp foot assembly having an outer ring shaped member fluidly and supportably connectable to the removably ring shaped member. The inner ring shaped member includes a central aperture for the cutting of a plate to be located. An outer curved edge surface of the inner ring shaped member includes at least one abutting surface to sealingly abut a curved edge of the outer ring member includes a groove for directing air from the outer ring member and through at least one hole in the inner member, whereby a fluid can be directed through each hole to the central aperture, and whereby at least one fluid jet can be formed to move coolant and/or waste from the cutting location with respect to the clamp foot.

16 Claims, 5 Drawing Sheets

(51) Int. Cl.
*B23Q 3/00* (2006.01)
*B23Q 11/00* (2006.01)

(56) References Cited

U.S. PATENT DOCUMENTS

| | | |
|---|---|---|
| 4,692,776 A | 9/1987 | Kimball |
| 4,890,963 A * | 1/1990 | Keritsis ............... B23Q 1/0036 |
| | | 285/190 |
| 5,087,156 A | 2/1992 | Kanaya et al. |
| 5,332,341 A | 7/1994 | Arai et al. |
| 5,846,330 A | 12/1998 | Quirk et al. |
| 2002/0104207 A1 * | 8/2002 | Smith .................... B23B 41/00 |
| | | 29/26 A |
| 2004/0202517 A1 | 10/2004 | Kowmowski |
| 2005/0169718 A1 | 8/2005 | Beckington |

OTHER PUBLICATIONS

International Search Report from International Patent Application No. PCT/NZ2013/000063, dated Dec. 5, 2014.

\* cited by examiner

CLAMP FOOT AIR JET APPARATUS

BACKGROUND

The invention relates to a clamp foot air jet apparatus including a clamp foot assembly for plate cutting machines in profile cutting machines including flame and plasma cutting machines. The invention is directed particularly but not solely towards a servo clamp foot to move coolant and chips.

In this specification unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

Normally on flame and plasma cutting machines having a bridge, the bridge is fitted with multiple tooling such as oxy fuel torches, plasma torches and marking heads and can also be fitted with machining heads such as drilling and milling heads. Each cutting tool currently uses their own lifter mechanism on a common carriage which is redundant when that tool type is not required.

Machines that incorporate plasma cutting and oxy fuel cutting with machining heads usually require some sort of coolant to be applied to the machining head. Additionally when these machining heads are being used they generate metal chips from the drilling and other machining operations.

One method to remove the coolant and chip waste is by using a containment area around the machining tool to limit the spread of the coolant and chips over the plate being cut.

Connected to this containment area can be connected a vacuum system to such the chips and coolant away from this area.

The problem with this is that the air flow generated by the vacuum is often not sufficient to remove the coolant and chips sitting the surface of the plate.

The problem is that coolant and chips sitting on the surface of the plate do not get evacuated during the machining process.

It is an object of the invention to provide an improved clamp foot air jet apparatus for plate cutting machines that ameliorates some of the disadvantages and limitations of the known art or at least provide the public with a useful choice.

In a first aspect the invention consists in a clamp foot air jet apparatus like for example a servo controlled clamp foot, clamp foot for clamping a plate for a cutting tool of a cutting machine to cut the plate therein with coolant producing waste, the clamp foot apparatus including a clamp foot assembly comprising an outer ring shaped member fluidly and supportably connected to an inner ring shaped member including a central aperture for the cutting to be located, the inner ring shaped member having outer and inner curved edge surfaces, whereby the outer curved edge surface of the inner ring shaped member includes at least one abutting surface to sealing abut the inner curved edge of the outer ring member, which is an outer curved peripheral surface including a groove for receiving and directing air from the outer ring member to and through at least one hole in the inner ring shaped member, and the inner ring member includes at least one hole extending from the groove of the outer curved edge to the inner curve edge surface whereby a fluid can be directed through each hole to the central aperture whereby at least one fluid jet can be formed to clear or move coolant and/or waste from the cutting location with respect to the clamp foot.

Preferably the sealing means including upper and lower sealing grooves provided in the outer curved edge surfaced of at least the inner ring shaped member for the location of at least one O ring or other sealing method which in use abuts an inner curved surface of the lower recessed groove of the outer ring shaped member.

Preferably the inner curve edge surface of the inner ring shaped member is sloped downwardly from its upper surface to its lower surface.

Preferably, there are a plurality of holes spaced around the inner ring shaped member.

Preferably the groove for receiving and directing air is located between the upper and lower sealing grooves.

Preferably the fluid is air which can be combined with any other gas or fluid.

Preferably each hole is angled to optimise cleaning the plate from the groove to the inner curved edge of the inner ring shaped member.

Preferably the inner ring shaped member includes a planar shaped body which is circular in shape.

Preferably the outer ring shaped member has a planar body with an inner curved edge whereas the outer edge is formed as a square shape.

In a second aspect the invention consists in a replaceable or removable ring shaped member for a clamp foot air jet apparatus for a clamp foot for clamping a plate for a cutting tool of a cutting machine to cut the plate therein with coolant producing waste, the clamp foot apparatus including a clamp foot assembly comprising an outer ring shaped member fluidly and supportably connected to the removably ring shaped member which is an inner ring shaped member including a central aperture for the cutting to be located, the inner ring shaped member having outer and inner curved edge surfaces, whereby the outer curved edge surface of the inner ring shaped member includes at least one abutting surface to sealing abut the inner curved edge of the outer ring member, which is an outer curved peripheral surface including a groove for receiving and directing air from the outer ring member to and through at least one hole in the inner ring shaped member, and the inner ring member includes at least one hole extending from the groove of the outer curved edge to the inner curve edge surface whereby a fluid can be directed through each hole to the central aperture whereby at least one fluid jet can be formed to clear or move coolant and/or waste from the cutting location with respect to the clamp foot.

Preferably, the sealing means including upper and lower sealing grooves provided in the outer curved edge surfaced of at least the inner ring shaped member for the location of at least one O ring which in use abuts an inner curved surface of the lower recessed groove of the outer ring shaped member. (note; there doesn't have to be o rings at all, sealant only could be used)

Preferably, the inner curve edge surface of the inner ring shaped member is sloped downwardly from its upper surface to its lower surface.

Preferably, the groove for receiving and directing air is located between the upper and lower sealing grooves Preferably, the fluid is air which can be combined with any other gas or fluid.

Preferably, additional holes can be added and angled from the air groove to the inner curved edge of the inner ring shaped member to any position on the plate where coolant and chips are not extracted sufficiently.

Preferably, the outer ring shaped member has a planar body with an inner curved edge whereas the outer edge is formed as a square shape wherein the inner ring shaped member includes a planar shaped body which is circular in shape.

To those skilled in the art to which the invention relates, many changes in construction and widely differing embodiments and application of the invention will suggest themselves without departing from the scope of the invention as defined in the appended claims. The disclosures and the descriptions herein are purely illustrative and are not intended to be limiting.

BRIEF DESCRIPTION OF THE DRAWINGS

The invention will now be described, by way of example only, by reference to the accompanying drawings.

DETAILED DESCRIPTION

The following description will describe the invention in relation to preferred embodiments of the invention, namely a clamp foot air jet apparatus for plate cutting machines. The invention is in no way limited to these preferred embodiments as they are purely to exemplify the invention only and that possible variations and modifications would be readily apparent without departing from the scope of the invention.

As shown in FIGS. 1-7 there is a clamp foot air jet apparatus 1 connected to or formed as part of a clamp foot 2 that is used to surround a machining head and is used to clamp plate during machining operations on the plate. The clamp foot 2 includes a vertical leg portion 3 slidably joined to or connected to or formed including the clamp foot air jet apparatus 1. The vertical leg 3 is operatively connected to a plate cutting machine which allows the vertical leg portion 3 with the clamp foot air jet apparatus 1 to at least slide vertically on a similarly vertical support 3a in accordance with any manual or automatic cutting instructions.

Figure 1:
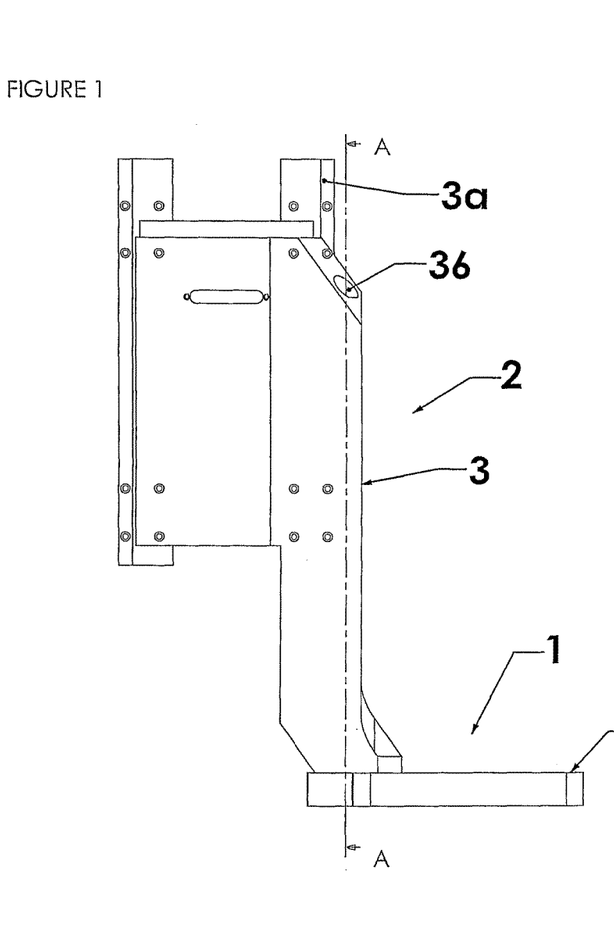
FIG. 1 is a side view of clamp foot air jet apparatus.
Figure 1A:
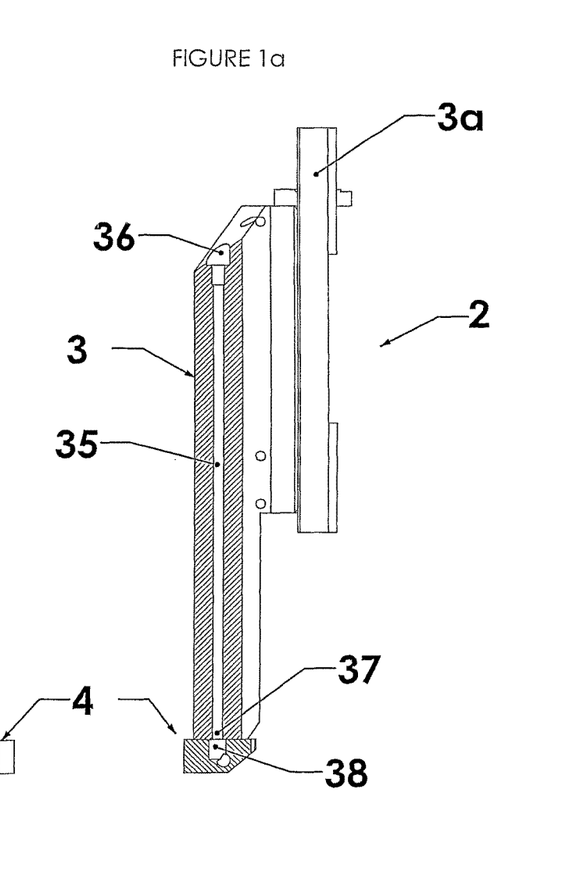
FIG. 1a is a section A-A based on FIG. 1.

The clamp foot apparatus 1 includes a clamp foot assembly. In use the leg portion 3 is oriented substantially vertically and is operatively connected to a movable carriage (not shown) with cutting torches (not shown), of afore mentioned plate cutting machine and has an upper end and lower end. Clamp foot apparatus 1 is located at one end ie at the lower end of the clamp foot 1 as seen in FIG. 1. The clamp foot assembly is oriented substantially horizontally and is adapted to hold a plate on a cutting table (not shown) to be cut underneath the clamp foot assembly. As shown, clamp foot assembly is horizontally oriented when in use, and includes an outer ring shaped member 4 having a central aperture 5 and an inner ring shaped member 6 having a central aperture 7. Both central apertures 5 and 7 can be contiguous and/or adjacent each other. Inner ring shaped member 6 is formed as a separate member to the outer ring member 6 and is sealing engaged by sealing means to the outer ring 4 which can be made to be removable or not. Inner ring member 6 is able to be removed and/or replaced as required.

Outer Ring Shaped Member 4 as Seen in FIGS. 1-4

The outer ring shaped member 4 of the clamp foot assembly has a planar shaped body with an upper planar surface 8 and lower planar surface 9 with an outer curved edge 10 and inner curved edge 11. Inner curved edge 11 borders the central aperture 5 and is shaped having different shapes on each side of the clamp foot apparatus 1 (see FIGS. 2 and 3) whereby as shown on the left of Section A-A inner curve edge 11 is simply a vertical wall or as shown on the right of Section A-A there can be a stepped formation which includes an upper angled wall portion 12 and lower recessed groove portion whereby the lower recessed groove portion is made up of a horizontal recessed part 14 leading to a vertical curved recess wall part 15 (forming a corner) at a base thereof of the lower recessed groove portion which in use meet lower surface 9 and cutting table. Lower recessed groove though the surfaces are planar they do have part of the sealing means which includes suitable grooves like for example first and second seal grooves 28 and 29.

Figure 2:
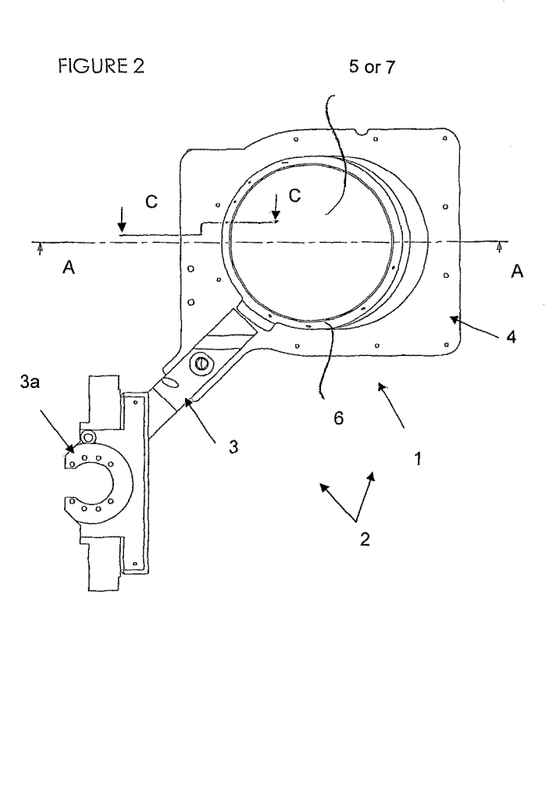
FIG. 2 is a top plan view of the clamp foot air jet apparatus.
Figure 2A:
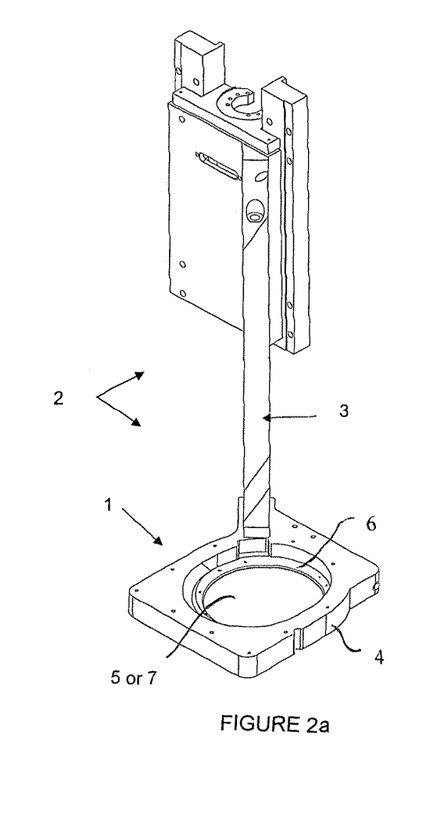
FIG. 2a is a side plan vies of the clamp foot air jet apparatus.

Outer curved edge 10 is as shown, can be substantially vertical in orientation being at right angles to upper surface 8 and lower surface 9 but as shown in FIG. 2 outer curved edge 10 can be formed as non curved edges forming overall a square shape.

Figure 5:
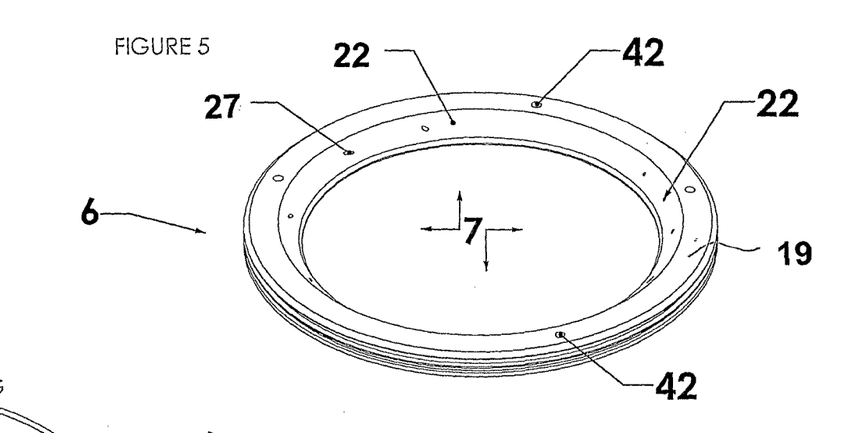
FIG. 5 is a perspective view of the inner ring 6.
Figure 6:
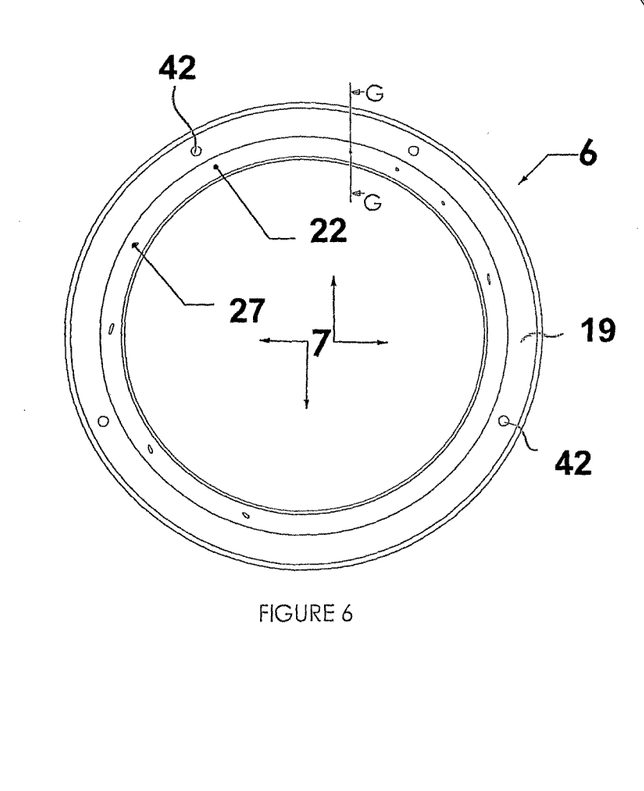
FIG. 6 is a top plan view of the inner ring 6.
Figure 7:
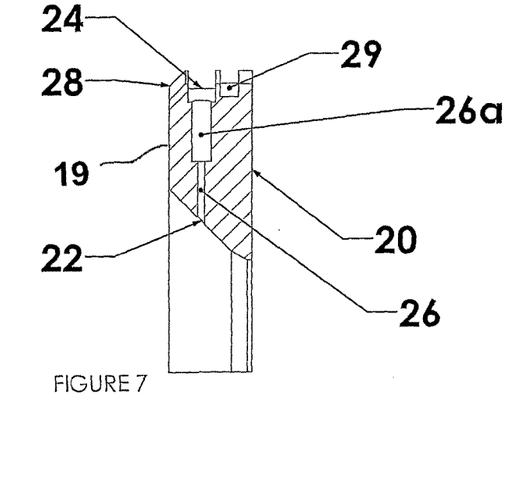
FIG. 7 is a cross sectional view Section G-G as labelled in FIG. 6.

Inner Ring Shaped Member 6—FIGS. 5-7

The clamp assembly which includes inner ring shaped member 6 is shaped and sized to sealingly and connectably inter-fit with the lower recessed portion of the outer ring shaped member 4 and be fluidly interconnected together. Inner ring shaped member 6 includes a planar shaped body with an upper surface 14, lower surface 20 bordered by an outer curved vertical edge 21 and an inner curved and angled edge 12.

Outer curved vertical edge surface 21 includes substantially vertical curved peripheral surface with a horizontally oriented groove 24 peripherally located extending at least part of the vertical surface and located part way down the vertical edge surface 21. Also joined fluidly to groove 24 there is an air supply hole in the form of a hole 26a and hole 26 leading from groove 24 to central aperture 7 exiting at exit aperture 22. Hole 26 as shown in cross section is can be oriented in a slope or angle whereby there is an entry end at groove 24 and exit end at the central aperture 5. As shown in FIG. 7 the entry end can have an entrance section 26a of a larger diameter or depth than the depth of the hole 26. In plan view hole 26 can be angled at any angle to the inner curved edge 22.

Figures 3, 3A, 3B:
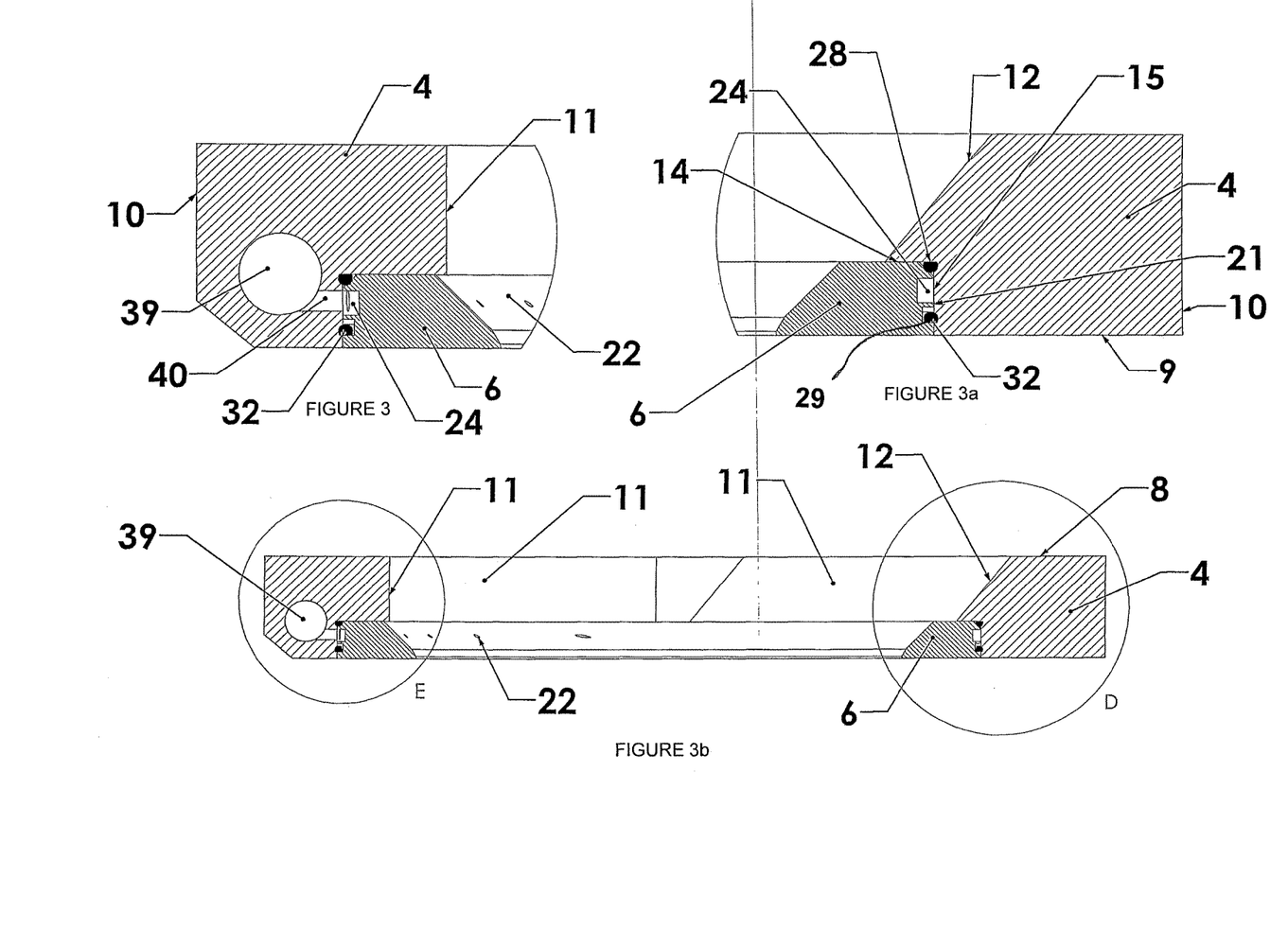
FIG. 3 is close up cross sectional side view Detail D of the clamp foot of FIG. 1 showing the connection from the circular air groove 30 from the outer ring 4 to the inner ring 6.
FIG. 3a is a close up cross sectional side view Detail E of part of the clamp foot showing an outer hole 30 thru 4 and a cross drilled hole linking to groove 24.
FIG. 3b is a cross section view Section A-A of the clamp foot apparatus.
Figure 4:
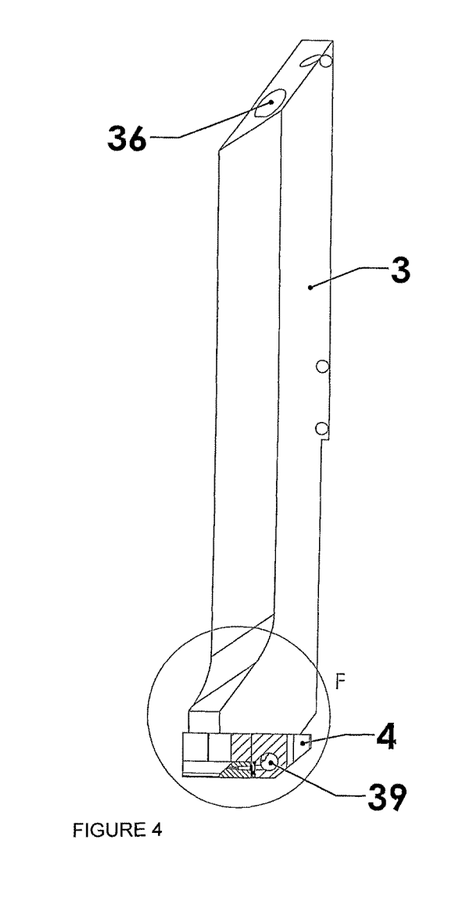
FIG. 4 is a partial cross section perspective view for Section C-C of the vertical leg 3 and cross section of the clamp foot.
Figure 4A:
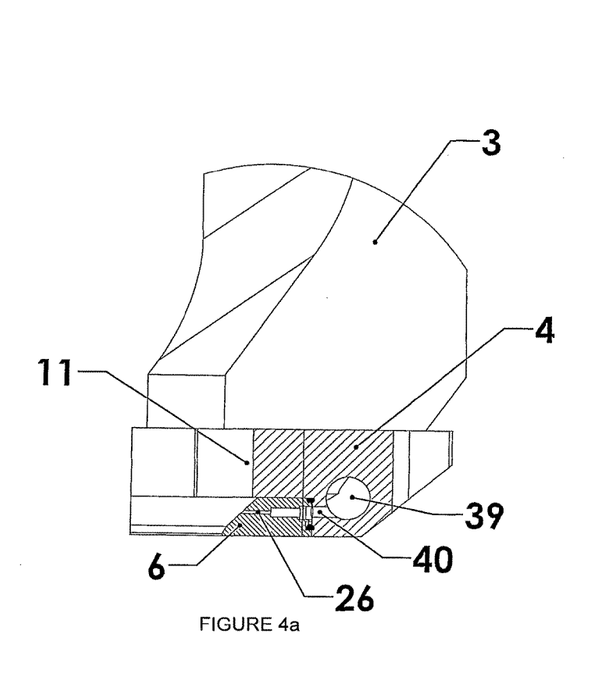
FIG. 4a is a close up cross section Detail F of the inner and outer rings.

Also as part of the sealing means, as an example, inner ring shaped member 6 can also comprise a first seal groove or chamfer 28 located at a top of the outer curved edge 21 and a second seal groove 29 located below and spaced from the first seal groove 28 as seen in FIGS. 3 and 4. First seal groove 28 is a bevel to enable locating a O ring 28 into the corner formed with 4. Similarly second groove 29 is also curved in shape. There is also a hole entrance 26a for groove 24 for receiving air, located between the first and second seal grooves 28 & 29 which can be formed in any cross section such as for example as a square groove (any shape is possible).

When the inner ring member 6 is slidably interfitted with the outer ring member 4, all of the grooves 28, 29 & 9a are then enclosed and aligned, in that first seal groove or chamfer 28 is bordered by the corner of the inner curved edge 14 and second seal groove 29 and tunnel entrance groove 30 are bordered by the inner vertical wall edge 21.

A sealing means 32 can be located within the enclosed and aligned seal grooves 28, 29 which includes for example sealant or at least one O ring whereby the inner ring 6 is fluidly sealed to the outer ring 4. Groove 28 can be formed as a chamfer on the top corner of the inner ring member 6.

Movable vertical leg portion 3 as seen in FIGS. 1 and 4 has an air inlet tunnel 35 having a top entrance aperture 36 leading down the inlet tunnel 35 and exiting at bottom at exit 37 which is then fluidly joined to a vertical entry tunnel 38 located in the outer ring member 4. Still within outer ring member 4 there is a horizontal hole 39 which is fluidly joined to the vertical tunnel 38 and hole 39 which extends some distance in horizontal plane, which then fluidly connects with another horizontal tunnel 40 which is which is fluidly connected to outer groove 24 located an outer wall of inner ring member 6. As shown in the figures outer groove 24 fluidly leads to at least one hole 26 ending in exit aperture 22 which such hole 26 can be angled in any direction to direct air to wherever is required in the central aperture 5 and/or 7, to move coolant and waste away from a cutting position with respect to the foot.

Inner ring member 6 is able to be removed and or replaced as required. This can include different ring members 6 having different hole 26 patterns or shapes with the exit apertures located in different positions. Inner ring member 6 can be joined in combination with the sealing means to the outer ring member 4, with positive fastening such as for example being bolted or screwed through any suitable fastening apertures 42

Advantages a) Able to add air jets to any location around the ring member
b) Able to move coolant away from the cutting area.
c) Able to move waste from the cutting area
d) Provides an air jet peripherally around the ring member
e) Air jet can be formed as compressed air

VARIATIONS

Throughout the description of this specification, the word "comprise" and variations of that word such as "comprising" and "comprises", are not intended to exclude other additives, components, integers or steps.

The sealing means can be any item that ensures sealing between the inner and outer rings 6 and 4 such as for example sealant and/or gasket. There can be at least one sealing O ring or any number of any selected diameter within at least one groove 28 or 29. Other methods of sealing are also possible such as flexible sealers and/or fasteners. Additionally the grooves 28 or 29 can be of any selected diameter, size, cross section or number, orientation. The number of air holes or tunnels 26 can also be varied according to size, shape and orientation in the vertical and horizontal planes. Additionally the shape of the outer 4 and inner rings 6 can also be varied as long as these rings can be sealingly engaged together. Central apertures 5 and 7, can be formed of the same diameter or not or can be a different shape other than being circular and can be stepped.

Fluid is disclosed as being able to be directed through at least the inner ring shaped member 6 though any other type of fluid or combination such as for example air or gas or coolant as a liquid can be directed through the inner ring shaped member and/or the outer ring shaped member and vertical leg support 3.

The air as directed through the holes 26 from the groove (eg air groove) 24 can be directed in either direction if required ie into the central apertures 5 and 7 or in the opposite direction. The air supply for the air groove 24, though not shown can be formed as piercing or being located on top of the foot clamp 4 as is required or desired. Though air is disclosed as being used to be directed through the groove 24 and tunnel 26 other gases or fluid either in place of air or in combination with air, are also possible. Holes as a term are used to describe any shaped passage like a tunnel for example, which can be straight or angle or curved of any cross section with or with deflecting means like for example ribs or vanes.

It will also be understood that where a product, method or process as herein described or claimed and that is sold incomplete, as individual components, or as a "kit of Parts", that such exploitation will fall within the ambit of the invention.

These and other features and characteristics of the present invention, as well as the method of operation and functions of the related elements of structures and the combination of parts and economics of manufacture, will become more apparent upon consideration of the following description with reference to the accompanying drawings, all of which form part of this specification, wherein like reference numerals designate corresponding parts in the various figures.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However it is to be understood that the invention may assume various alternative variations, except where expressly specified to the contrary. It is also to be understood that the specific devices illustrated in the attached drawings, and described in the following specification are simply exemplary embodiments of the invention. Hence specific dimensions and other physical characteristics related to the embodiments disclosed herein are not to be considered as limiting.

It will of course be realised that while the foregoing has been given by way of illustrative example of this invention, all such and other modifications and variations thereto as would be apparent to persons skilled in the art are deemed to fall within the broad scope and ambit of this invention as is hereinbefore described.

What I claim is:

1. A clamp foot apparatus for clamping a plate while a cutting tool of a cutting machine cuts the plate, the clamp foot apparatus comprising: an outer ring shaped member fluidly and supportably connected to an inner ring shaped member, the inner ring shaped member comprising a central aperture for the cutting to be located and having an outer curved edge and an inner curved edge; wherein the outer curved edge of the inner ring shaped member comprises: at least one abutting surface to sealingly abut an inner curved surface of the outer ring shaped member, a groove for receiving and directing a fluid from the outer ring shaped member to and through at least one hole in the inner ring shaped member; and wherein the at least one hole extends from the groove in the outer curved edge to the inner curved edge and directs the fluid into the central aperture and forms at least one fluid jet to clear or move matter from a surface of the plate within the central aperture.

2. The clamp foot apparatus as claimed in claim 1, further comprising a first seal groove and a second seal groove provided in the outer curved edge of the inner ring shaped member for the location of at least one O-ring, which in use abuts the inner curved surface of the outer ring shaped member.

3. The clamp foot apparatus as claimed in claim 1, wherein the inner curved edge of the inner ring shaped member is sloped downwardly from an upper surface of the inner ring shaped member to a lower surface of the inner ring shaped member.

4. The clamp foot apparatus as claimed in claim 1, wherein the fluid is air which can be combined with any other gas or fluid.

5. The clamp foot apparatus as claimed in claim 1, wherein the at least one hole is angled from the groove for receiving and directing the fluid to the inner curved edge of the inner ring shaped member.

6. The clamp foot apparatus as claimed in claim 1, wherein the outer ring shaped member and the inner ring shaped member each comprises a planar body.

7. A replaceable or removable ring shaped member for a clamp foot apparatus for clamping a plate while a cutting tool of a cutting machine cuts the plate, the replaceable or removable ring shaped member configured to connect to an outer ring shaped member of the clamp foot apparatus in use, the replaceable or removable ring shaped member comprising: an outer curved edge and an inner curved edge, the inner curved edge defining a central aperture for the cutting to be located; at least one abutting surface on the outer curved edge to sealingly abut an inner curved surface of the outer ring shaped member, a groove for receiving and directing a fluid from the outer ring shaped member to and through at least one hole in the replaceable or removable ring shaped member; and wherein the at least one hole extends from the groove of the outer curved edge to the inner curved edge and directs the fluid into the central aperture and forms at least one fluid jet to clear or move matter from a surface of the plate within the central aperture.

8. The replaceable or removable ring shaped member as claimed in claim 7, further comprising a first seal groove and a second seal groove provided in the outer curved edge of the replaceable or removable ring shaped member for the location of sealing means for sealing against the inner curved surface of the outer ring shaped member.

9. The replaceable or removable ring shaped member as claimed in claim 7, wherein the inner curved edge is sloped downwardly from an upper surface to a lower surface of the replaceable or removable ring shaped member.

10. The replaceable or removable ring shaped member as claimed in claim 7, wherein the fluid is air which can be combined with any other gas or fluid.

11. The replaceable or removable ring shaped member as claimed in claim 7, wherein the at least one hole is angled from the groove for receiving or directing the fluid to the inner curved edge.

12. The replaceable or removable ring shaped member as claimed in claim 7, further comprising a planar body which is circular in shape.

13. The clamp foot apparatus as claimed in claim 2, wherein the groove for receiving and directing the fluid is located between the first seal groove and the second seal groove.

14. The clamp foot apparatus as claimed in claim 1, wherein the groove for receiving and directing the fluid comprises a square cross section.

15. The replaceable or removable ring shaped member as claimed in claim 8, wherein the groove for receiving and directing the fluid is located between the first seal groove and the second seal groove.

16. The replaceable or removable ring shaped member as claimed in claim 8, wherein the groove comprises a square cross section.

* * * * *